United States Patent
Xu et al.

(10) Patent No.: US 9,635,744 B2
(45) Date of Patent: Apr. 25, 2017

(54) LED LIGHTING DEVICE, WIRELESS NETWORK AND CONTROL METHOD THEREOF

(71) Applicant: SENGLED OPTOELECTRONICS CO., LTD., Tongxiang (CN)

(72) Inventors: Yi Xu, Tongxiang (CN); Chaoqun Sun, Tongxiang (CN); Jinxiang Shen, Tongxiang (CN)

(73) Assignee: SENGLED OPTOELECTRONICS CO., LTD., Tongxiang (CN)

( * ) Notice: Subject to any disclaimer, the term of this patent is extended or adjusted under 35 U.S.C. 154(b) by 0 days.

(21) Appl. No.: 15/109,011

(22) PCT Filed: Dec. 29, 2015

(86) PCT No.: PCT/CN2015/099510
§ 371 (c)(1),
(2) Date: Jun. 29, 2016

(87) PCT Pub. No.: WO2016/107556
PCT Pub. Date: Jul. 7, 2016

(65) Prior Publication Data
US 2016/0366751 A1    Dec. 15, 2016

(30) Foreign Application Priority Data

Dec. 30, 2014  (CN) .......................... 2014 1 0843150

(51) Int. Cl.
*H05B 37/02* (2006.01)
*H05B 39/04* (2006.01)
(Continued)

(52) U.S. Cl.
CPC ..... *H05B 37/0272* (2013.01); *H05B 33/0842* (2013.01); *H05B 33/0884* (2013.01); *H05B 37/02* (2013.01); *H04W 84/18* (2013.01)

(58) Field of Classification Search
None
See application file for complete search history.

(56) References Cited

U.S. PATENT DOCUMENTS

2005/0014467 A1    1/2005  Ishiwata et al.
2012/0299509 A1*  11/2012  Lee ..................... H04L 41/0806
                                                                315/291
(Continued)

FOREIGN PATENT DOCUMENTS

CN    201341258 Y    11/2009
CN    104602404 A     5/2015
(Continued)

OTHER PUBLICATIONS

The World Intellectual Property Organization (WIPO) International Search Report for PCT/CN2015/099510 Mar. 18, 2016.

*Primary Examiner* — Anh Tran
(74) *Attorney, Agent, or Firm* — Anova Law Group, PLLC

(57) ABSTRACT

The present disclosure provides a first LED lighting device. The first LED lighting device includes a lighting source, a first detecting module, a first processing module, a first wireless communication module for communicating with a wireless router in an LED lighting device-based wireless mesh network, and a second wireless communication module for communicating with at least one second lighting device in the LED lighting device-based wireless mesh network. The first detecting module receives a detection request sent by the second wireless communication module and detects a signal strength of the wireless router based on the detection request. The first processing module sends a start signal to the first wireless communication module. The first wireless communication module receives the start signal, forms a connection with the wireless router based on the (Continued)

start signal, and sends an LED network-forming request to the second wireless communication module.

19 Claims, 10 Drawing Sheets

(51) Int. Cl.
*H05B 41/36* (2006.01)
*H05B 33/08* (2006.01)
*H04W 84/18* (2009.01)

(56) References Cited

U.S. PATENT DOCUMENTS

2014/0300293 A1* 10/2014 Ruan .................. H05B 33/0842
    315/294
2015/0312994 A1* 10/2015 Leung ................ H05B 37/0272
    315/151

FOREIGN PATENT DOCUMENTS

| CN | 204425708 U | 6/2015 |
| KR | 20080071878 A | 8/2008 |

* cited by examiner

LED LIGHTING DEVICE, WIRELESS NETWORK AND CONTROL METHOD THEREOF

CROSS-REFERENCES TO RELATED APPLICATIONS

This application is a national phase entry under 35 U.S.C. §371 of International Application No. PCT/CN2015/099510, filed on Dec. 29, 2015, which claims priority of Chinese Patent Application No. 201410843150.9 filed on Dec. 30, 2014. The above enumerated patent applications are incorporated by reference herein in their entirety.

FIELD OF THE DISCLOSURE

The present disclosure generally relates to the field of light emitting diode (LED) technologies and, more particularly, relates to LED lighting devices, wireless network, and method for remotely control the wireless network.

BACKGROUND

An LED (Light Emitting Diode) is a semiconductor device for converting electricity or electric energy to visible light. An LED can directly convert electricity to light. LED lights have advantages including energy conservation, environmental protection, controllable lighting, being highly practical, high stability, short response time, and long operation lifetime, etc. LED lights have been widely used in the low-carbon lifestyle. LED lighting leads the trend in highly efficient "green" lighting applications. The unique power supplies and control methods of LED lighting devices support the integration of smart control and multimedia capabilities in various lighting and other electronic devices.

In practice, many applications require a plurality of LED lights. In conventional lighting technologies, when a plurality of LED lights/lighting devices are controlled by a remote server, each LED lighting device is individually connected to the wireless router and communicates/interacts with the remote server through the wireless router. The server individually controls each LED lighting device. The conventional lighting technologies may waste a great amount of network resources. Also, since the plurality of LED lighting devices may each have a different distance to the wireless router, the communications between the LED lighting devices located on the edge of the wireless signal coverage are and the remote server may have poor quality.

BRIEF SUMMARY OF THE DISCLOSURE

The disclosed devices and methods are directed to at least partially solve or improve, for example, communication stability and the use of network resources.

One aspect or embodiment of the present disclosure provides a first LED lighting device. The first LED lighting device includes an LED lighting source, a first detecting module, a first processing module, a first wireless communication module for communicating with a wireless router in an LED lighting device-based wireless network, and a second wireless communication module for communicating with at least one second lighting device in the LED lighting device-based wireless network. The LED lighting device-based wireless network is configured to include the wireless router, the first LED lighting device, and the at least one second LED lighting device. The second wireless communication module is connected to both of the first wireless communication module and the first detecting module, and the first wireless communication module is electrically connected to the first processing module. After the second communication module obtains a master-light-selecting broadcast message, the first detecting module receives a detection request sent by the second wireless communication module and detects a signal strength of the wireless router based on the detection request. When the first processing module determines a signal strength detected by the first detecting module has a maximum value among signal strengths detected by the plurality of LED lighting devices in the LED lighting device-based wireless network, the first processing module sends a start signal to the first wireless communication module. The first wireless communication module receives the start signal, forms connection with the wireless router based on the start signal, and sends an LED network-forming request to the second wireless communication module. The second wireless communication module receives the network-forming request, sends a master-light-notifying broadcast message to the at least one second LED lighting devices, and forms connection with the at least one second LED lighting devices, wherein the master-light-notifying broadcast message includes identification of the first LED lighting device.

Another aspect or embodiment of the present disclosure provides a second LED lighting device. The second lighting device includes an LED lighting source, a second detecting module, a second processing module, and a third wireless communication module for enabling communication between a first LED lighting device and the second LED lighting device in an LED lighting device-based wireless network. The LED lighting device-based wireless network includes a wireless router, the first LED lighting device, and at least one second LED lighting device. The third wireless communication module is electrically connected to the second detecting module and the second processing module. The second detecting module receives a detection request sent by the third wireless communication module after the third wireless communication module receives a master-light-selecting broadcast and detects a signal strength of the wireless router based on the detection request. When the second processing module determines a signal strength of the wireless router detected by the second detecting module does not have a maximum value among signal strengths detected by the plurality of LED lighting devices in the LED lighting device-based wireless network, the second processing module sends a master-light-obtaining signal to the third wireless communication module. The third wireless communication module receives the master-light-obtaining signal, receives a master-light-notifying broadcast message containing identification of the first LED lighting device sent by the first LED lighting device, and forms connection with the first LED lighting device based on the identification of the first LED lighting device.

Another aspect of the present disclosure provides an LED lighting device-based wireless network. The LED lighting device-based wireless network includes a wireless outer, a first LED lighting device provided by the present disclosure, and a second LED lighting device provided by the present disclosure.

Another aspect of the present disclosure provides a method for remotely controlling the LED lighting device-based wireless network. The method includes steps 100 to step 103. In step 100, the first LED lighting device detects the signal strength of the wireless router after obtaining a master-light-selecting broadcast message. In step 101, if the first LED lighting device determines the signal strength of the wireless router detected by the first LED lighting device has a maximum value among the signal strengths detected by the plurality of LED lighting devices in the LED lighting device-based wireless network, the first LED lighting device forms connection with the wireless router. In step 102, the first LED lighting device sends a master-light-notifying broadcast message containing the identification of the first LED lighting device to the at least one second LED lighting devices. In step 103, the second LED lighting device receives the master-light-notifying broadcast message and forms connection with the first LED lighting device based on the identification.

BRIEF DESCRIPTION OF THE DRAWINGS

The following drawings are merely examples for illustrative purposes according to the disclosed embodiments and are not intended to limit the scope of the present disclosure.

DETAILED DESCRIPTION

Figure 1:
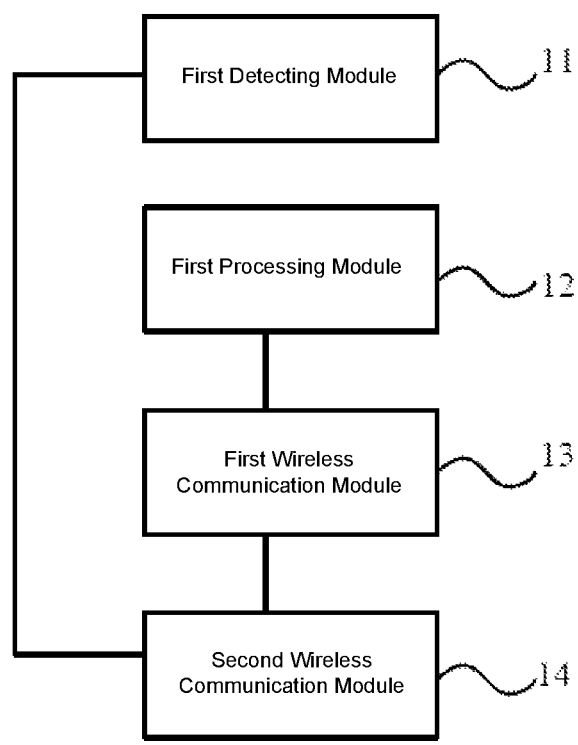
FIG. 1 is a block diagram illustrating an exemplary first LED lighting device consistent with the disclosed embodiments.

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiment, persons of ordinary skill in the art may derive other embodiments consistent with the present disclosure, all of which are within the scope of the present invention.

In the present disclosure, an LED lighting device may be a master light or a slave light in a lighting system. The master light and the salve light are lighting devices with one or more LED lighting sources and one or more wireless communication modules integrated with the lighting devices. In some embodiments, the LED lighting sources may be one or more LED lighting chips. The lighting devices may be used to provide lighting for an indoor space or an outdoor space. In some embodiments, the LED lighting sources may be used as indicator lights. In some embodiments, the LED lighting sources may include both lights for general lighting purposes and indicator lights.

The master light may refer to the LED lighting device that is directly connected to the wireless router to communicate/interact with the remote server. A slave light may refer to the LED lighting device that is connected to the master light to be indirectly connected to the wireless and communicate/interact with the remote server. A master-light-selecting broadcast message may refer to a broadcast message sent to certain LED lighting devices in the wireless network to select the master light. An LED network-forming request may refer to a request for forming a connection/network between certain LED lighting devices. A master-light-notifying broadcast message may refer to a broadcast message for notifying the selection of the master light. A temporary-master-light-selecting broadcast message may refer to a broadcast message sent to certain LED lighting devices in the wireless network to select the temporary master light. A temporary-master-light-notifying broadcast message may refer to a broadcast message for notifying the selection of the temporary master light.

It is noted that although FIGS. 1-12, as described below, do not explicitly show lighting sources in the drawings, the LED lighting devices in the embodiments of the present disclosure include lighting sources such as one or more LED lighting chips. For example, the LED lighting devices as described in FIGS. 1-12 may be smart lights with networking capabilities. The various communication modules and other functional modules are software and/or hardware components that are integrated into the smart lights. These smart lights may be used to provide lighting in a space (a room, a outdoor space). These smart lights may also form a lighting device network.

In some embodiments of the present disclosure, the lighting function and the network functions of the LED lighting devices may be integrated. For example, during the selection process of the temporary master light, the lighting source of the master light may change brightness level or light color for a set period of time to indicate the status of the master light selection. In another example, the lighting device may maintain the light output for general lighting purposes while changing the color of one or more indicator lights to show the status of various network functions and connection status. For example, when a lighting device is properly connected to the network, an indicator light may be set to green. When a lighting device is not properly connected to the network, an indicator light may be set to red. When a new lighting device is joining the network, the lighting device may flashing the indicator light.

FIG. 1 illustrates the structure of an exemplary first LED lighting device consistent with the present disclosure. As shown in FIG. 1, the first LED lighting device may include a first detecting module 11, a first processing module 12, a first wireless communication module 13, and a second wireless communication module 14. The first wireless communication module 13 may communicate with a wireless router in an LED lighting device-based wireless network (i.e., a wireless network formed by LED lighting devices and other devices). The second wireless communication module 14 may communicate with at least one second lighting device in the LED lighting device-based wireless network. The LED lighting device-based wireless network may include the wireless router, the first LED lighting device, and the at least one second LED lighting device.

The second wireless communication module 14 may be electrically connected to both of the first wireless communication module 13 and the first detecting module 11. The first wireless communication module 13 may be electrically connected to the first processing module 12.

The first detecting module 11 may receive a detection request sent by the second wireless communication module 14 after the second communication module 14 receives the master-light-selecting broadcast message. The first detecting module 11 may detect the signal strength of the wireless router based on the detection request.

When the first processing module 12 determines that the signal strength detected by the first detecting module 11 has the maximum value, the first processing module 12 may send a start signal to the first wireless communication module 13. The maximum signal strength may represent the signal strength having the maximum/highest/strongest value among the signal strengths detected from all the LED lighting devices in the LED lighting device-based wireless network (e.g., including the LED lighting devices distributed at different locations of the wireless network).

The first wireless communication module 13 may receive the start signal sent by the first processing module 12, and form a connection with the wireless router based on the start signal. The first wireless communication module 13 may also send an LED network-forming request to the second wireless communication module 14.

The second wireless communication module 14 may receive the LED network-forming request, and send a master-light-notifying broadcast message to all the second LED lighting devices in the LED lighting device-based wireless network. The master-light-notifying broadcast message may include the identification of the first LED lighting device. The second wireless communication module 14 may form connection with all the second LED lighting devices in the LED lighting device-based wireless network.

The first detecting module 11 may be a signal strength detector. The first wireless communication module 13 may be a WiFi module. The interaction between the WiFi module and another device is based on wireless communication protocols. The second wireless communication module 14 may be a communication module. In one embodiment, the interaction between the second wireless communication module 14 and another device is based on communication protocols for wireless mesh network. A plurality of methods can realize the functions of the first processing module 12 and each method may apply different calculations. Details of the structure of the first processing module 12 are illustrated in the following embodiments.

It should be noted that, the first detecting module 11, the first processing module 12, the first wireless communication module 13, and the second wireless communication module 14 may each include a power supply circuit and/or be electrically connected to the lighting controller in the first LED lighting device. The lighting controller may provide power for each module described above. The use of a power supply circuit or the lighting controller may be determined by the application/embodiment and is not limited to the embodiments of the present disclosure.

In certain applications, a plurality of LED lighting devices may be controlled by the remote server. In conventional lighting technologies, each LED lighting device may communicate/interact with the wireless router through the first wireless communication module 13 such that each LED lighting device is connected to the wireless router through the first wireless communication module 13. Each LED lighting device can communicate/interact with the remote server through the wireless router. The remote server can control each LED lighting device separately.

In one embodiment provided by the present disclosure, a plurality of LED lighting devices and the wireless router may form the LED lighting device-based wireless network. The plurality of LED lighting devices may include the first LED lighting device and at least one second LED lighting device. The first detecting module 11, the first processing module 12, and the second wireless communication module 14 may be integrated into the first LED lighting device. If the signal strength of the wireless router detected by the first LED lighting device has the maximum value among the signal strengths of the wireless router detected by all the LED lighting devices in the wireless network, the first LED lighting device may form a connection with the wireless router through the first wireless communication module 13. Thus, the first LED lighting device may communicate/interact with the remote server such that the first LED lighting device can be directly controlled by the remote server. Also, the first LED lighting device may communicate/interact (e.g., based on communication protocols for wireless mesh network) with all the second LED lighting devices in the wireless network through the second wireless communication module 14. All the second LED lighting devices may have indirect communication/interaction with the remote server through the first LED lighting device such that the remote server can have centralized control over all the second LED lighting devices.

Specifically, after the second wireless communication module 14 receives a master-light-selecting broadcast message sent by another device in the wireless network, the second wireless communication module 14 may send a detection request to the first detecting module 11. It should be noted that, the device sending the broadcast message may be the main controller in the LED lighting device-based wireless network. The main controller may send a master-light-selecting broadcast message according to a predetermined period/cycle. The device sending the broadcast message may also be an LED lighting device in the wireless network. For example, the LED lighting device may be the current master light, and/or a slave light connected to the master light. The specific structure and function of the master light may be referred to as the first lighting device. The specific structure and function of the slave light may be referred to as the second LED lighting device.

When the LED lighting device functioning as the master light detects being disconnected from the wireless router or from the wireless network, all the LED lighting devices in the wireless network may not be able to be connected to the wireless network. The master light may send a master-light-selecting broadcast message to all the LED lighting devices in the wireless network. When the LED lighting device functioning as a slave light detects being disconnected from the master light, the slave lighting device may also send a master-light-selecting broadcast message to all the LED lighting devices in the wireless network. When the master lighting device, a slave lighting device, and/or the main controller receives information that a new LED lighting device is joining (i.e., being connected to) the wireless network, the master lighting device, the slave lighting device, and/or the main controller can all send a master-light-selecting broadcast message to all the LED lighting devices in the wireless network. All the LED lighting devices in the wireless network may select the master light based on the master-light-selecting broadcast message such that the master light selected is connected to the wireless router. All other LED lighting devices in the wireless network (i.e., the master light or the LED lighting devices except the LED lighting device directly connected to the wireless router) may be connected to the master light.

The first detecting module 11 may be a signal strength detector. When the first detecting module 11 receives the detection request from the second wireless communication module 14, the first detecting module 11 may check the signal strength of the wireless router in the wireless network. When the first processing module 12 detects that the signal detected by the first detecting module 11 has the maximum value among the signals detected by all the LED lighting devices, the first processing module 12 may choose the first LED lighting device to be the master light of the wireless network. That is, the first processing module 12 may send a start signal to the first wireless communication module 13. When the first wireless communication module 13 receives the start signal, the wireless communication module 13 may form a connection with the wireless router according to predetermined configuration information. After the connection is formed, the first wireless communication module 13 may send an LED network-forming request to the second communication module 14. When the second wireless communication module 14 receives the LED network-forming request, the second wireless communication module 14 may send a master-light-notifying broadcast message to all second LED lighting devices in the wireless network, where the broadcast message may contain the identification of the first LED lighting device. Each second LED lighting device may analyze the master-light-notifying broadcast message to obtain the identification of the first LED lighting device. Further, each second LED lighting device may form a connection with the first LED lighting device based on the identification. Thus, because the signal strength of the wireless router detected by the first lighting device has the maximum value among the signal strengths detected by all LED lighting devices in the wireless network, the first LED lighting device may be the master light in the wireless network, and all the second LED lighting devices may be the slave lights in the wireless network. The first LED lighting device may be connected to the wireless router through the first wireless communication module 13 and may communicate with the remote server through the wireless router. Thus, the first LED lighting device may be directly controlled by the remote server. Also, the first LED lighting device may be connected to all second LED lighting devices through the second wireless communication module 14 such that all of the second LED lighting devices may be connected to the wireless router through the first LED lighting device. Thus, all the second LED lighting devices may be centralized and indirectly controlled by the remote server.

In one embodiment, the first detecting module 11, the first processing module 12, the first wireless communication module 13 for communicating with the wireless router, and the second wireless communication module 14 for communicating with the second LED lighting devices in the wireless network may all be integrated within the first LED lighting device. If the first processing module 12 obtains that the signal strength of the wireless router detected by the first detecting module 11 has the maximum value among the signal strengths detected by all the LED lighting devices in the wireless network, the first processing module 12 may form a connection with the wireless router through the first wireless communication module 11. The first processing module 12 may send a master-light-notifying broadcast message to all the second LED lighting devices in the wireless network through the second wireless communication module 14 such that the first processing module 12 may form connections with all the second LED lighting devices in the wireless network through the second wireless communication module 14. That is, the first LED lighting device may be directly connected to the remote server through the wireless router. All the second LED lighting devices may be centralized and controlled by the remote server indirectly through the first LED lighting device. The arrangement/connection described above can ensure all the LED lighting devices in the wireless network to be connected to the wireless router through the master light with the maximum/strongest signal strength of the wireless router. The LED lighting devices connected to the master light can be centralized and controlled by the remote server indirectly through the master light. The arrangement/connection described above can save a great amount of network resources and improve the stability of the communication.

Figure 2:
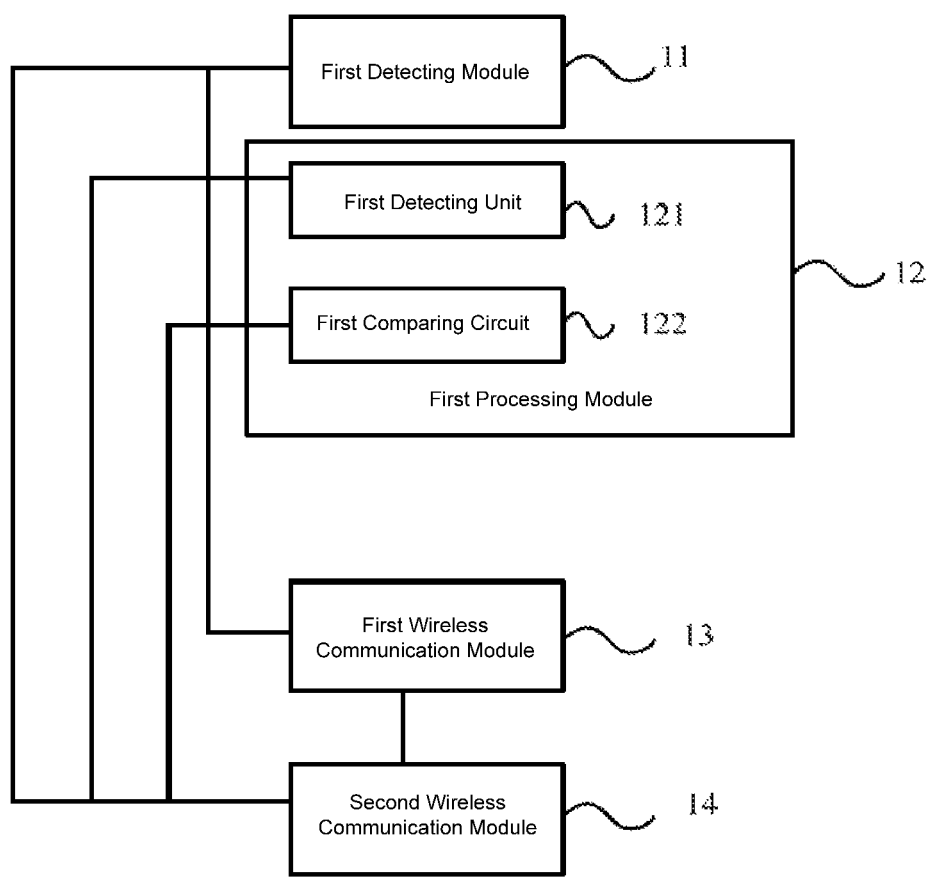
FIG. 2 is a block diagram illustrating another exemplary first LED lighting device consistent with the disclosed embodiments.

FIG. 2 illustrates the structure of another exemplary LED lighting device provided by the present disclosure. As shown in FIG. 2, the structure of the first processing module 12 is based on the first processing module 12 shown in FIG. 1. FIG. 2 illustrates the functioning and collaboration between each component/module of the first processing module 12 to realize the function of the first detecting module 11 (e.g., how to determine the signal strength detected by the first detecting module 11 has the maximum value). The first processing module 12 may include a first detecting unit 121 and a first comparing circuit 122.

The second wireless communication module 14 may be electrically connected to the first detecting unit 121 and the first comparing circuit 122. The first comparing circuit 122 may be electrically connected to the first detecting module 11 and the first wireless communication module 13.

The first detecting unit 121 may determine whether the first LED lighting device is functioning as the temporary master light when the second wireless communication module 13 obtains a master-light-selecting broadcast message. If the first LED light is functioning as the temporary master light, the first detecting unit 121 may send a temporary-master-light start signal to the second wireless communication module 14.

The second wireless communication module 14 may send a master-light-notifying broadcast message to all the second LED lighting devices based on the temporary-master-light start signal. The master-light-notifying broadcast message may contain the identification of the first LED lighting device. The second wireless communication module 14 may receive the signal strengths of the wireless router detected and sent by all second LED lighting devices and send all the signal strengths to the first comparing circuit 122.

The first comparing circuit 122 may compare the signal strengths detected by all the second LED lighting devices with the signal strength detected by the first detecting module 11. If the signal strength detected by the first detecting module 11 has the maximum value among all the signal strengths being compared, the first comparing circuit 122 may send a start signal to the first wireless communication module 13.

It should be noted that, a plurality of methods can realize the functions of the first detecting unit 121, and each method may apply a different structure. The specific structure of the first processing module 12 will be introduced in the following embodiments. For example, the first comparing circuit 122 can be a comparator chip.

Specifically, when the second wireless communication module 14 obtains the master-light-selecting broadcast message, the first detecting unit 121 can start detecting relevant information to determine whether the first LED lighting device is the temporary master light. The relevant information can include time information, saved hardware identification of LED lighting devices, and/or communication addresses assigned to the LED lighting devices. The relevant information can be selected according to specific applications/certain requirements. The first detecting unit 121 may determine whether the first LED lighting device is the temporary master light through methods such as comparing and inquiring for certain information.

If the first detecting unit 121 detects the first LED lighting device is functioning as the temporary master light, the first detecting unit 121 may send a temporary-master-light start signal to the second wireless communication module 14. The second wireless communication module 14 may send a temporary-master-light-notifying broadcast message to all the second LED lighting devices, where the temporary-master-light-notifying broadcast message may contain the identification of the first LED lighting device. All the second LED lighting devices may receive and analyze the temporary-master-light-notifying broadcast message to obtain the identification of the first LED lighting device. Further, all the second LED lighting devices may send the signal strengths of the wireless router detected by all the second LED lighting devices to the first LED lighting device (i.e., the temporary master light) based on the identification of the first LED lighting device. The first LED lighting device may receive the signal strengths detected and sent by all the second LED lighting devices and send the signal strength data to the first comparing circuit 122. The first comparing circuit 122 may compare the signal strengths detected by all the LED lighting devices with the signal strength detected by the first detecting module 11. If the first comparing circuit 122 determines the signal strength detected by the first detecting module 11 has the maximum value, the first detecting module 11 may send a start signal to the first wireless communication module 13.

It should be noted that, the first comparing circuit 122 may compare the signal strengths detected by all the second LED lighting devices with the signal strength detected by the first detecting module 11. If the first comparing circuit 122 detects that the signal strengths detected by the first detecting module 11 and by at least one of the second LED lighting devices both have the maximum value, the first comparing circuit 122 may determine/select the first LED lighting device to be the master light. Alternatively, the first comparing circuit 122 may coordinate with other second LED lighting devices with the same maximum signal strength through the second wireless communication module 14 and select the first LED lighting device to be the master light.

In one embodiment, based on the structure shown in FIG. 1, the first detecting unit 121 and the first comparing circuit 122 may be integrated into the first processing module 12. After the first detecting unit 121 determines the first LED lighting device to be the master device, the first comparing circuit 122 may obtain the signal strength of the wireless router detected by the first LED lighting device from the first detecting module 11. Through the second wireless communication module 14, the first comparing circuit 122 may communicate/interact with the second LED lighting devices and obtain the signal strengths detected by all the second LED lighting devices. Further, the comparing circuit 122 may determine the signal strength detected by the first LED lighting device has the maximum value such that the first LED lighting device can function as the temporary master light. The process described above may avoid simultaneous coordination and processing among a plurality of LED lighting devices in the wireless network such that less resources for processing is required. Processing efficiency can thus be improved.

Figure 3:
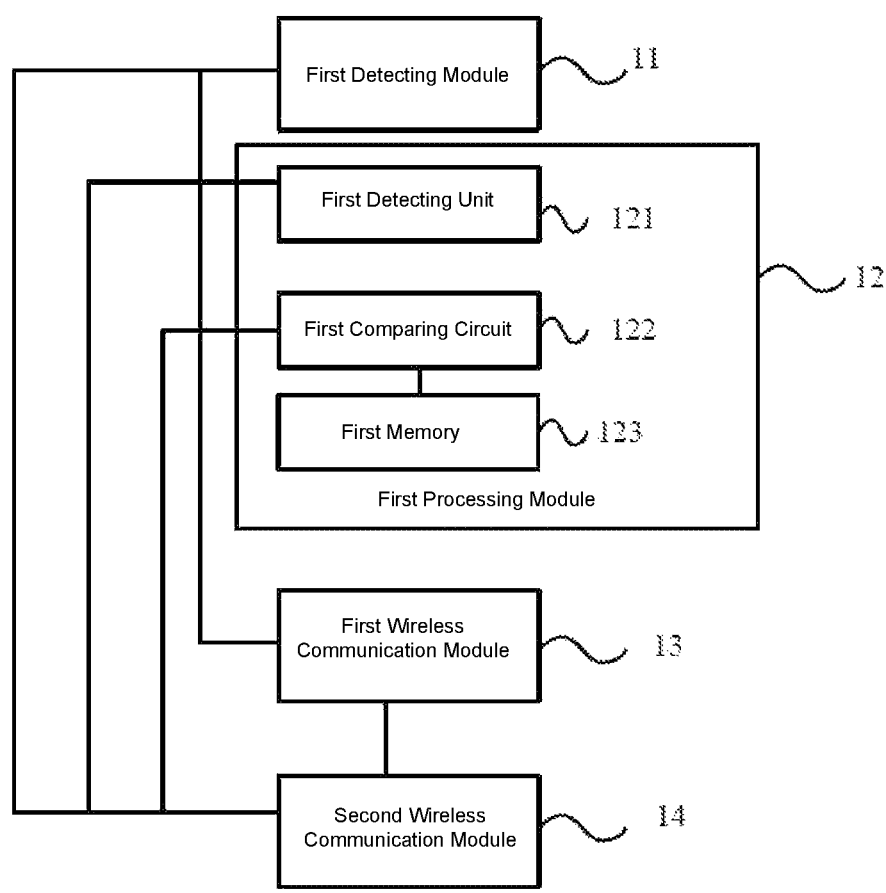
FIG. 3 is a block diagram illustrating another exemplary first LED lighting device consistent with the disclosed embodiments.

FIG. 3 illustrates the structure of another exemplary first LED lighting device provided by the present disclosure. As shown in FIG. 3, based on the first LED lighting device shown in FIG. 2, the first processing module 12 illustrated by FIG. 3 may further include a first memory 123 electrically connected to the first comparing circuit 122.

The first memory 123 may be used to store the signal strengths of the wireless router (i.e., detected by all the LED lighting devices in the LED lighting device-based wireless network) obtained by the first LED lighting device during process of selecting the master light.

Specifically, the first comparing circuit 122 may obtain the signal strength detected by the first LED lighting device from the first detecting module 11. The second wireless communication module 14 may communicate/interact with the second LED lighting devices in the wireless network to obtain the signal strengths of the wireless router detected by all the second LED lighting devices. The first comparing circuit 122 may determine the first LED lighting device to be the master light based on the signal strength information of all the LED lighting devices and store the signal strength information of all the LED lighting devices in the first memory 123. Since the locations of the wireless router and the LED lighting devices may be unchanged within a certain time period, the signal strength of the wireless router detected by each LED lighting device may also be unchanged while each LED lighting device is operating properly.

Thus, if after a certain time period a device in the wireless network sends another master-light-selecting broadcast message to trigger the selection of the master light and the locations of the wireless router and the LED lighting devices have not changed compared to the most recent selection of the master light, the first LED lighting device functioning as the most recent temporary master light may provide the signal strengths of the wireless router detected by all LED lighting devices in the wireless network to the current temporary master light through the first memory 123 for selecting the master light. The arrangement/design described above may avoid the LED lighting devices to send repeating information and save processing resources and network resources. The processing efficiency can thus be improved.

Figure 4:
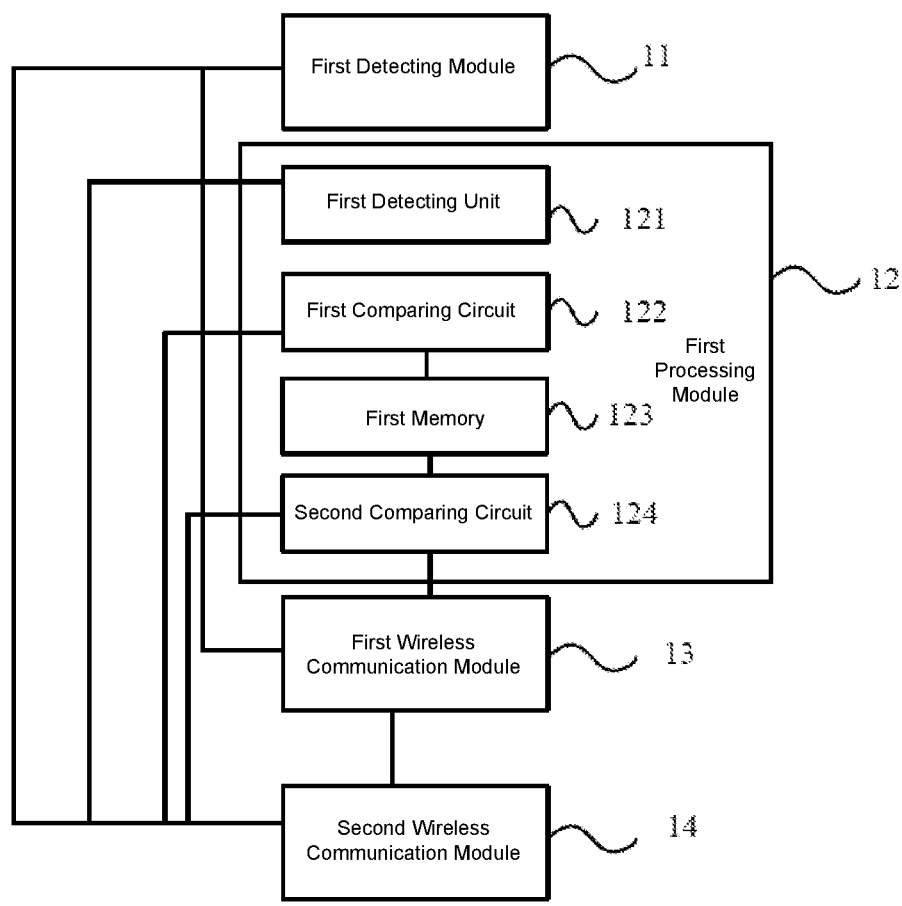
FIG. 4 is a block diagram illustrating another exemplary first LED lighting device consistent with the disclosed embodiments.

FIG. 4 illustrates the structure of another exemplary first LED lighting device provided by the present disclosure. As shown in FIG. 4, based on the first LED lighting device shown in FIG. 4, the first processing module 12 may further include a second comparing circuit 124.

The second comparing circuit 124 may be electrically connected to the second wireless communication module 14, the first wireless communication module 13, and the first memory 123.

The first detecting unit 121 may determine whether the first LED lighting device is functioning as the temporary master light after the second wireless communication module 14 receives a master-light-selecting broadcast message. If the first LED lighting device is not functioning as the temporary master light, the first detecting unit 121 may send a temporary-master-light-obtaining signal to the second wireless communication module 14.

The second wireless communication module 14 may receive the temporary-master-light-obtaining signal and obtain the signal strength detected by the first detecting module 11 based on the temporary-master-light-obtaining signal. Further, when the second wireless communication module 14 is receiving a temporary-master-light-notifying broadcast message (i.e., containing the identification of the second LED lighting devices) sent by a second LED lighting device, the second wireless communication module 14 may send the signal strength detected by the first detecting module 11 to the second LED lighting device based on the identification of the second LED lighting device. The second wireless communication module 14 may also receive a master-light-notifying broadcast message (i.e., containing the identification of the master light) sent by the second LED lighting device, and send the identification of the master light to the second comparing circuit 122.

If the second comparing circuit 122 detects the identification of the master light is the same as the identification of the first LED lighting device stored in the first memory 123, the second comparing circuit 122 may send a start signal to the first wireless communication module 13.

Specifically, FIG. 4 provides another application. In this case, a second LED lighting device may function as the temporary master light and the temporary master light may determine first LED lighting device to be the master light. Specifically, when the second wireless communication module 14 receives the broadcast message for selecting the master light, the first detecting unit 121 may start detecting relevant information to determine whether the first LED lighting device is the temporary master light. The relevant information may include time information, saved hardware identification of the LED lighting devices, and/or communication addresses assigned to the LED lighting devices. The selection of the relevant information may be determined according to specific applications/certain requirements. The first detecting unit 121 may determine whether the first LED lighting device is the temporary master light through certain methods such as comparing and inquiring the relevant information obtained. If the first detecting unit 121 determines the first LED lighting device is not the temporary master light, the first detecting unit 121 may send a temporary-master-light-obtaining signal to the second wireless communication module 14.

The second wireless communication module 14 may receive the temporary-master-light-obtaining signal and obtains the signal strength detected by the first detecting module 11 based on the temporary-master-light-obtaining signal. When the second wireless communication module 14 receives a temporary-master-light-notifying broadcast message, (i.e., containing the identification of the second LED lighting device) sent by a second LED lighting devices, the second wireless communication module 14 may send the signal strength detect by the first detecting module 11 to the second LED lighting device functioning as the temporary master light according to the identification of the second LED lighting devices.

After the temporary master light receives the signal strengths detected by all the LED lighting devices, the temporary master light may determine the LED lighting device with the maximum signal strength to be the master light and send a master-light-notifying broadcast message to all the LED lighting devices in the wireless network, where the master-light-notifying broadcast message may contain the identification of the master light. The first LED lighting device may receive and analyze the broadcast message to obtain the master-light-notifying broadcast message including the identification of the master light through the second wireless communication module 14, and send the identification of the master light to the second comparing circuit 122. If the second comparing circuit 122 detects that the identification of the master light is same as the identification of the first LED lighting device previously stored in the first memory 123, the second comparing circuit 122 may determine the first LED lighting device to be the master light and send a start signal to the first wireless communication module 13.

In one embodiment, after the first detecting unit 121 determines the second LED lighting device to be the temporary master light, the second wireless communication module 14 may obtain the signal strength detected by the first LED lighting device from the first detecting module 11 and send the signal strength obtained to the second LED lighting device functioning as the temporary master light. The second LED lighting device functioning as the temporary master light may compare the signal strengths detected by all the LED lighting devices and determine the first LED lighting device has the maximum signal strength. Thus, the second LED lighting device functioning as the temporary master light may determine the master light. The process described above may avoid simultaneous processing and coordination among a plurality of LED lighting devices in the wireless network. Less resources for processing is required and processing efficiency can be improved.

Figure 5:
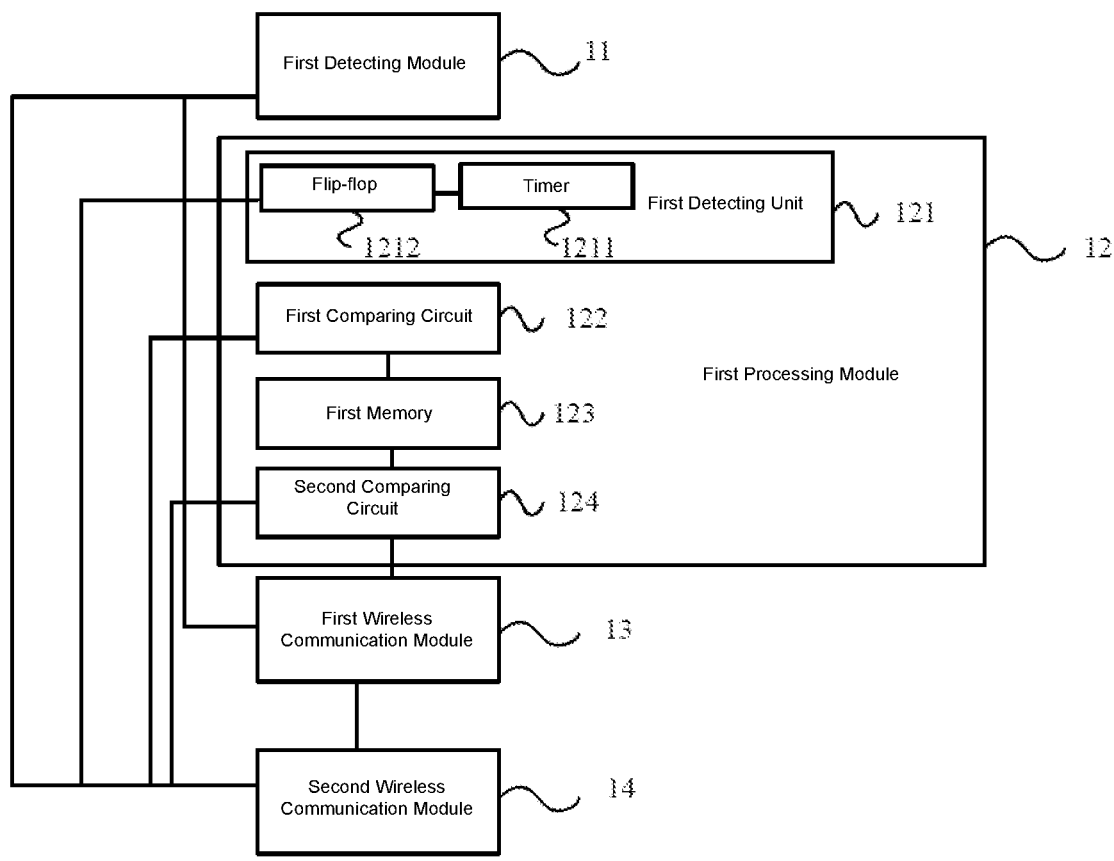
FIG. 5 is a block diagram illustrating another exemplary first LED lighting device consistent with the disclosed embodiments.

FIG. 5 illustrates the structure of another exemplary first LED lighting device provided by the present disclosure. As shown in FIG. 5, based on the first LED lighting devices shown in FIGS. 2 to 4, the structure of the first detecting unit 121 may be specified. FIG. 5 illustrates coordination between each components of the first detecting unit 121 for determining whether the first LED lighting device is the temporary master light. The first detecting unit 121 may include a timer 1211 and a flip-flop/latch 1212. The flip-flop circuit 1212 may be electrically connected to the timer 1211 and the second wireless communication module 14.

The timer 1211 may set a temporary-master-light operation schedule corresponding to the first LED lighting device. If the operation time of an LED lighting device starts, the timer may send a triggering signal to the flip-flop circuit 1212.

The flip-flop circuit 1212 may receive the triggering signal and indicate whether the first LED lighting device is the temporary master light by controlling the flashing of an indicator light or changing the color of the indicator light.

Specifically, the temporary-master-light operation schedule corresponding to the first LED lighting device can be set in the timer 1211. If the operation time of an LED lighting device starts, the timer 1211 may send a triggering signal to the flip-flop circuit 1212. The flip-flop circuit 1212 may receive the triggering signal and indicate whether the first LED lighting device is the temporary master light. The flip-flop circuit 1212 may indicate whether the first LED lighting device is the temporary master light by controlling the flashing of an indicator light of changing the color of an indicator light. The flip-flop circuit 1212 may be a lighting control device. For example, when the first LED lighting device is not operating as the temporary master light, the lighting control device may present a green light; when the lighting control device receives the triggering signal indicating the first LED lighting device is functioning as the temporary master light, the lighting control device may present a red light. Alternatively, when the first LED lighting device is not functioning as the temporary master light, the lighting control device may not turn on any light; when the lighting control device receives the triggering signal indicating the first LED lighting device is functioning as the temporary master light, the lighting control device may present a flashing light.

In one embodiment, by setting the temporary-master-light operation schedule corresponding to each LED lighting device through the timer, each LED lighting device can rotate to operate as the temporary master light according to a certain schedule. The operation load can thus be distributed/processed with more balance. The resources used by the LED lighting devices and the use of the LED lighting devices can be more uniformly distributed (e.g., more balanced).

Figure 6:
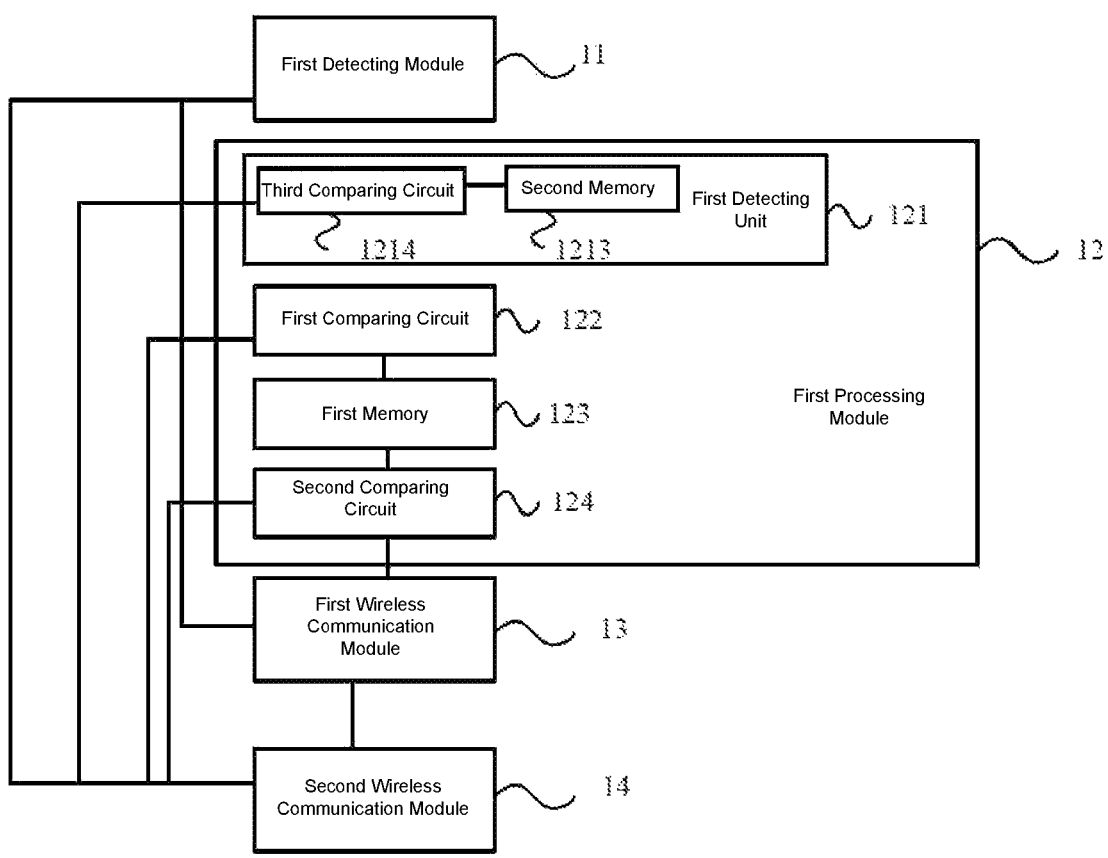
FIG. 6 is a block diagram illustrating another exemplary first LED lighting device consistent with the disclosed embodiments.

FIG. 6 illustrates the structure of another exemplary first LED lighting device provided by the present disclosure. Based on the first LED lighting devices shown in FIGS. 2 to 4, the structure of the first detecting unit 121 may be specified in FIG. 6. FIG. 6 illustrates the coordination between each component of the first detecting unit 121 to determine whether the first LED lighting device is the temporary master light. The first detecting unit may include a second memory 1213 and a third comparing circuit 1214. The third comparing circuit 1214 may be electrically connected to the second memory 1213 and the second wireless communication module 14.

The second memory 1213 may be used to store the MAC (Media Access Control) addresses of all the LED lighting devices in the wireless network.

The third comparing circuit 1214 may compare the MAC addresses of all the LED lighting devices to detect whether the MAC address of the first LED lighting device has the maximum value. The third comparing circuit 1214 may determine the first LED lighting device to be the temporary master light if the MAC address of the first LED lighting device has the maximum value.

Specifically, the third comparing circuit 1214 may compare the MAC addresses of all the LED lighting devices stored in the second memory 1213. Through the comparison, if the third comparing circuit 1214 detects the MAC address of the first LED lighting device has the maximum value, the third comparing circuit 1214 may determine the first LED lighting device to be the temporary master light; if the third comparing circuit 1214 detects the MAC address of the first LED lighting device does not have the maximum value, the third comparing circuit 1214 may determine the first LED lighting device does not function as the temporary master light.

In one embodiment, by using the third comparing circuit 1214 to compare the MAC addresses of all the LED lighting devices stored in the second memory 1213, whether the MAC address of the first LED lighting device has the maximum value can be determined. Thus, whether the first LED lighting device can function as the temporary master light can be determined. Often, the MAC address of an LED lighting device stays unchanged. That is, when no new light is joining the wireless work and when no current light is malfunctioning, the LED lighting device corresponding to the maximum MAC address often stays the same. Thus, the temporary master light may stay unchanged within a certain period of time. After the first master light is determined, the temporary master light may obtain the signal strength detected by each of the LED lighting device and store the signal strengths (e.g., in the second memory 1213). Whenever necessary, the temporary master light may directly read the information from local memory (i.e., the second memory 1213). The processing efficiency can be improved.

Further, the second wireless communication module 14 may receive a joining-notifying broadcast message sent by a new second LED lighting device joining the wireless network. The second wireless communication module 14 may send a master-light-selecting broadcast message to all the second LED lighting devices in the LED lighting device-based wireless network based on the master-light-selecting broadcast message.

Specifically, when a new second LED lighting device is joining the wireless network, the new second LED lighting device may send a joining-notifying broadcast message to all the LED lighting devices in the wireless network. The first LED lighting device may receive the joining-notifying broadcast message through the second wireless communication module 14. That is, the total number of LED lighting devices in the wireless network may be changing. Since it is possible that the signal strength of the wireless router detected by the new second LED lighting device may have the maximum value, the master light may need to be selected again to ensure the LED lighting device with the strongest/maximum signal strength is connected to the wireless router and is functioning as the master light and all the other LED lighting devices (i.e., the LED lighting devices except for the master light) and connected to the master light as slave lights. Thus, the second wireless communication module 14 may send a master-lighting-selecting broadcast message to all the second LED lighting devices in the wireless network based on the joining-notifying broadcast message. The process described above can ensure the master light can be dynamically adjusted according to the number of the LED lighting devices in the wireless network.

Figure 7:
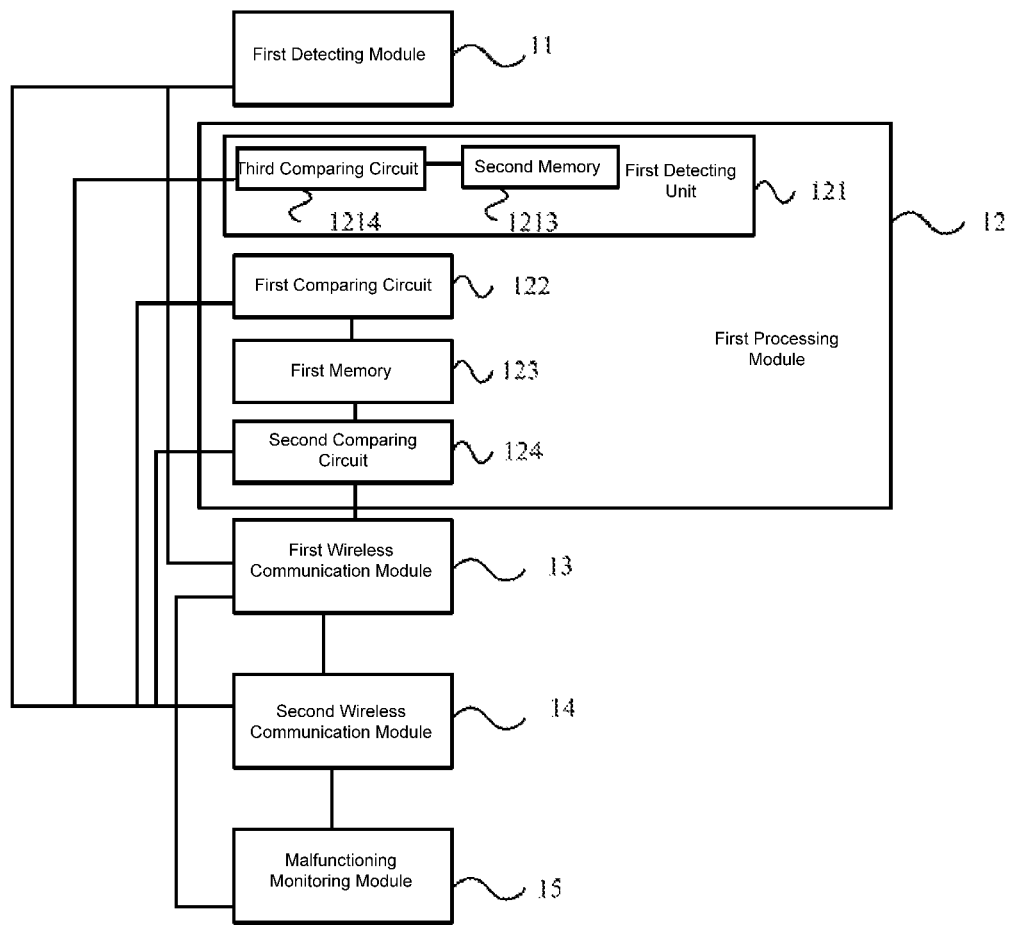
FIG. 7 is a block diagram illustrating another exemplary first LED lighting device consistent with the disclosed embodiments.

FIG. 7 illustrates the structure of another exemplary first LED lighting device provided by the present disclosure. Based on the first LED lighting devices shown in FIGS. 1 to 6, the first LED lighting device may further include a malfunctioning monitoring module 15 in FIG. 7.

The malfunctioning monitoring module 15 may be electrically connected to the first wireless communication module 13 and the second wireless communication module 14.

The first wireless communication module 13 may send a first detection request to the wireless router within a predetermined period after being connected to the wireless router. The first wireless communication module 13 may also receive a first feedback signal sent by the wireless router.

The malfunctioning monitoring module 15 may monitor whether the first wireless communication module 13 has sent the first detection request within the predetermined period and/or whether the first wireless communication module 13 has received the first feedback signal sent by the wireless router. If the malfunctioning monitoring module 15 detects the first wireless communication module 13 has not sent the first detection request within the predetermined period and/or the first wireless communication module 13 has not received the first feedback signal sent by the wireless router, the malfunctioning monitoring module 13 may send a first master-light-selecting-triggering signal to the second wireless communication module 14.

The second wireless communication module 14 may receive the first master-light-selecting-triggering signal, and send a master-light-selecting broadcast message to all the second LED lighting devices based on the first master-light-selecting-triggering signal. The master-light-selecting broadcast message may contain the malfunctioning information of the first LED lighting device. When the first LED lighting device recovers from the malfunctioning, the malfunctioning monitoring module 15 may detect the recovery and send corresponding information to the second wireless communication module 14. The second wireless communication module 14 may send a master-light-selecting broadcast message to all the second LED lighting devices, where the master-light-selecting broadcast message may contain the recovery information of the first LED lighting device.

In one embodiment, after the first LED lighting device forms connection with the wireless router as the master light, the malfunctioning monitoring module 15 may monitor whether the connection/link between the first wireless communication module 13 and the wireless router functions properly. If the connection/link malfunctions, the remote server may not control the first LED lighting device through the wireless router, and the second LED lighting devices in the wireless network may not be able to communicate with the wireless router through the master light. That is, the second LED lighting devices may not be centralized to be controlled by the remote server. Thus, the master light may need to be selected again and the first LED lighting device functioning as the current master light may no longer function as the master light before recovering from the malfunctioning. In other words, the total number of LED lighting devices in the wireless network decreases. The LED lighting device functioning as the master light can be adjusted dynamically according to a varied total number of the total LED lighting devices in the wireless network. The remote server can control the LED lighting devices with improved stability.

Further, after connected to all the second LED lighting devices, the second wireless communication module 14 may also send a second detection request to all the second LED lighting devices within a predetermined period. The second wireless communication module 14 may receive second detecting feedback signals sent by all the second LED lighting devices.

The malfunctioning monitoring module 15 may monitor whether the second wireless communication module 14 has sent the second detection request within the predetermined period and/or has received the second detecting feedback signals. If the second wireless communication module 14 has not sent the second detection request within the predetermined period and/or has not received the second detecting feedback signals, the malfunctioning monitoring module 15 may send a second master-light-selecting triggering signal to the first wireless communication module 13.

The first wireless communication module 13 may receive the second master-light-selecting triggering signal and send a master-light-selecting broadcast message to all the second LED lighting devices based on the second master-light-selecting triggering signal. The master-light-selecting broadcast message may contain the malfunctioning information of the first LED lighting device. After the first wireless communication module 13 detects the recovery of the first LED lighting device from the malfunctioning through the malfunctioning monitoring module 15, the first communication module 13 may send a master-light-selecting broadcast message to all the second LED lighting devices. The master-light-selecting broadcast message may contain the recovery information of the first LED lighting device.

In one embodiment, after the first LED lighting device (i.e., functioning as the master light) forms a connection with all the second LED lighting devices in the wireless network, the malfunctioning monitoring module 15 may monitor whether the connection/link between the second wireless communication module 14 and all the second LED lighting devices functions properly. If the connection/link malfunctions, the second LED lighting devices may not be able to communicate with the wireless router indirectly through the master light. That is, the second LED lighting devices may not be centralized to be controlled by the remote server. Thus, the master light may need to be selected again and the first LED lighting device functioning as the current master light may no longer function as the master light before recovering from the malfunctioning. In other words, the total number of the LED lighting devices in the wireless network decreases. The LED lighting device functioning as the master light can be adjusted dynamically according to varied number of the LED lighting devices in the wireless network. The remote server can control the LED lighting devices with improved stability.

Figure 8:
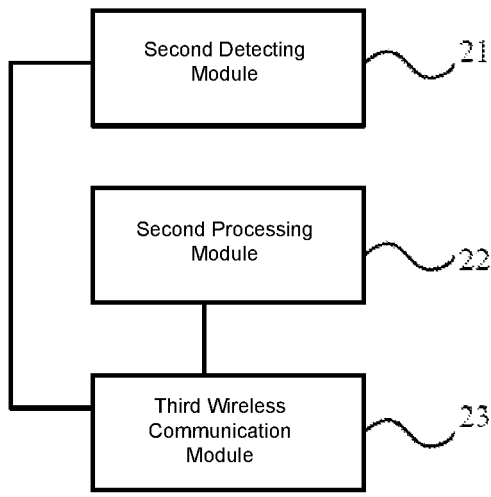
FIG. 8 is a block diagram illustrating an exemplary second LED lighting device consistent with the disclosed embodiments.

FIG. 8 illustrates the structure of an exemplary second LED lighting device provided by the present disclosure. The second LED lighting device shown in FIG. 8 may coordinate with the first LED lighting device shown in FIG. 1 for operation. The second LED lighting device may include a second detecting module 21, a second processing module 22, and a third wireless communication module 23. The third wireless communication module 23 may enable communication between the first LED lighting device and the second LED lighting device in the LED lighting device-based wireless network. The LED lighting device-based wireless network may include the wireless router, the first LED lighting device, and the at least one second LED lighting device.

The third wireless communication module 23 may be electrically connected to the second detecting module 21 and the second processing module 22.

The second detecting module 21 may receive a detection request sent by the third wireless communication module 23 after the third wireless communication module 23 receives the master-light-selecting broadcast. The second detecting module 21 may detect the signal strength of the wireless router based on the detection request.

When the second processing module 22 detects the signal strength of the wireless router detected by the second detecting module 21 does not have the maximum value among the signal strengths detected by all the LED lighting devices in the wireless network, the second processing module 22 may send a master-light-obtaining signal to the third wireless communication module 23.

The third wireless communication module 23 may receive the master-light-obtaining signal and receive a master-light-notifying broadcast message sent by the first LED lighting device, where the master-light-notifying broadcast message may contain identification of the first LED lighting device functioning as the master light. Based on the identification contained in the broadcast message, the third wireless communication module 23 may form connection with the first LED lighting device.

The second detecting module 21 may be a signal strength detector. The third wireless communication module may be a communication module based on communication protocols for wireless mesh network. It should be noted that, a plurality of methods can be used to realize the function of the second processing module 22 and each method may apply a different structure to obtain the function. The specific structure of the second processing module 12 is described in the disclosed embodiments.

It should be noted that, the second detecting module 21, the second processing module 22, and the third wireless communication module 23 may each have a power supply circuit (e.g., a power supply circuit installed on each module), and/or be electrically connected to the lighting controller of the second LED lighting device. The lighting controller can also provide power for each module described above. The selection of power supply may be determined upon different application and is not limited to the embodiments of the present disclosure.

Specifically, when the third wireless communication module 23 receives a master-light-selecting broadcast message sent by another device in the wireless network, the third wireless communication module 23 may send a detection request to the second detecting module 21. It should be noted that, the device sending the master-light-selecting broadcast message may be the main controller of the LED lighting device-based wireless network and/or an LED lighting device in the wireless network. For example, the main controller may send a master-light-selecting broadcast message to the LED lighting devices in the wireless network according to a predetermined cycle/period. The LED lighting device sending the broadcast message may be the current master light (e.g., having the structure and function of the first LED lighting device disclosed) or may be a slave light connected to the master light (e.g., having the structure and function of the second LED lighting device disclosed).

When the LED lighting device functioning as the master light is disconnected from the wireless router and/or the current wireless network, all the LED lighting devices in the wireless network may not be connected to the wireless network. The master light may send a master-light-selecting broadcast message to all the LED lighting devices in the wireless network. When the LED lighting device functioning as a slave light is disconnected from the current master light, the master light may also send a master-light-selecting broadcast message to all the LED lighting devices in the wireless network. When a lighting device (e.g., functioning as the master light or the slave light) and/or the main controller detects that a new LED lighting device is joining the wireless network, the lighting device and/or the main controller may also send a master-light-selecting broadcast message to all the LED lighting devices in the wireless network. Thus, all the LED lighting devices in the wireless network may select the master light according to the master-light-selecting broadcast message such that the master light selected is connected to the wireless router and all the other LED lighting devices are connected to the master light.

The second detecting module 21 may be a signal strength detector. When the second detecting module 21 receives the detection request sent by the third wireless communication module 23, the second detecting module 21 may detect the signal strength of the wireless router based on the detection request. When the second processing module 22 detects that the signal strength detected by the second detecting module 21 does not have the maximum value among the signal strengths detected by all the LED lighting devices in the wireless network, the second processing module 22 may determine the second LED lighting device is not the master light in the wireless network. The second processing module 22 may send the master-light-obtaining signal to the third wireless communication module 23. After receiving the master-light-obtaining signal, the third wireless communication module 23 may wait for the master-light-notifying broadcast message sent by the master light. After receiving the master-light-notifying broadcast message sent by the master light, the third wireless communication module 23 may analyze the broadcast message to obtain the identification of the first LED lighting device to determine the first LED lighting device is the master light. That is, the signal strength detected by the first LED lighting device has the maximum value among the signal strengths detected by all the LED lighting devices in the wireless network. The third wireless communication module 23 may form a connection with the first LED lighting device according to the identification of the first LED lighting device. Thus, the second LED lighting device described above may function as a slave light and communicate with the wireless router indirectly through the first LED lighting device. In other words, the second LED lighting device described above and other second LED lighting devices in the wireless network may be centralized to be controlled by the remote server indirectly.

In one embodiment, the second detecting module 21, the second processing module 22, and the third wireless communication module 23 may be integrated in a second LED lighting device, in the LED lighting device-based wireless network. If the second processing module 22 detects that the signal strength of the wireless router detected by the second detecting module 21 does not have the maximum value among the signal strengths detected by all the LED lighting devices, the second processing module 22 may receive the master-light-selecting broadcast message from the master light through the third communication module 23 and form a connection with the first LED lighting device (i.e., functioning as the master light). Thus, as a slave light, the second LED lighting device may indirectly communicate with the wireless router through the first LED lighting device. The second LED lighting device and other second LED lighting devices in the wireless network may be centralized and indirectly controlled by the remote server through the first LED lighting device (i.e., functioning as the master light). The arrangement/connection described above can ensure all the LED lighting devices in the wireless network are connected to the wireless router through the master light with the strongest signal strength to be controlled by the remote server. Thus, less network resources are required and the communication in the wireless network can have improved stability.

Figure 9:
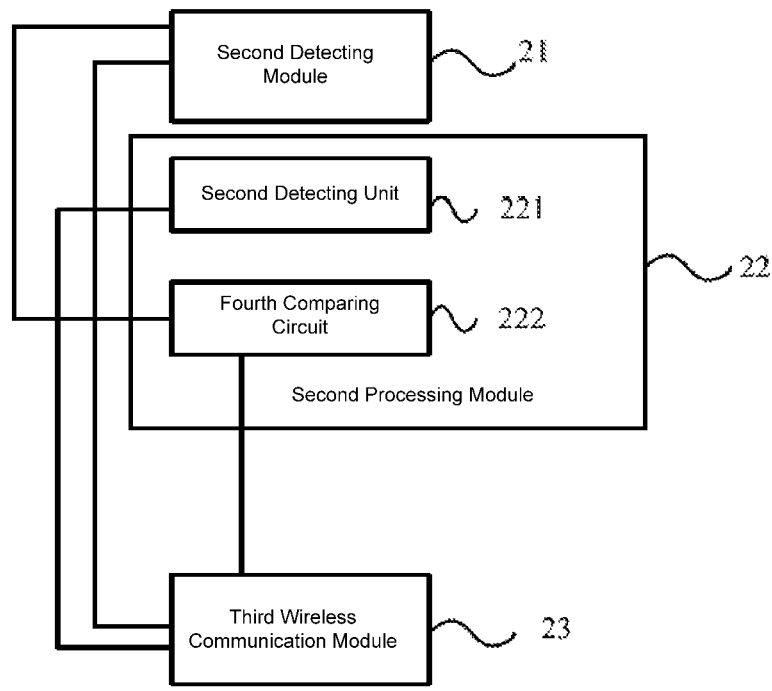
FIG. 9 is a block diagram illustrating another exemplary second LED lighting device consistent with the disclosed embodiments.

FIG. 9 illustrates the structure of another exemplary second LED lighting device provided by the present disclosure. Based on the structure shown in FIG. 8, the structure of the second processing module shown in FIG. 9 can be specified. FIG. 9 illustrates the coordination between the second processing module 22 and other components/modules to realize the function of the second processing module 22 (e.g., how to obtain that the signal strength detected by the second processing module 21 does not have the maximum value among the signal strengths detected by the all the LED lighting devices in the wireless network). The second processing module 22 may include the second detecting unit 221 and the fourth comparing circuit 222.

The third wireless communication module 23 may be electrically connected to the second detecting unit 221 and the fourth comparing circuit 222. The fourth comparing circuit 222 and the second detecting module 21 may be electrically connected.

The second detecting unit 221 may determine whether the second LED lighting device is functioning as the temporary master light after the third wireless communication module 23 obtains the master-light-selecting broadcast message. If the second LED lighting device is functioning as the temporary master light, the second detecting unit 221 may send a temporary-master-light start signal to the third wireless communication module 23.

The third wireless communication module 23 may send a temporary-master-light-notifying broadcast message to the other LED lighting devices in the LED lighting device-based wireless network based on the temporary-master-light start signal. The temporary-master-light-notifying broadcast message may contain the identification of the second LED lighting device. The third wireless communication module 23 may also receive the signal strengths of the wireless router detected by other LED lighting devices in the wireless network and send the signal strengths to the fourth comparing circuit 222.

The fourth comparing circuit 222 may compare the signal strengths detected by the other LED lighting devices with the signal strength detected by the second detecting module 21. If the fourth comparing circuit 222 detects that the signal strength detected by the second detecting module 21 does not have the maximum value among the signal strengths detected by all the LED lighting devices, the fourth comparing circuit 222 may send a master-light-obtaining signal to the third wireless communication module 23.

It should be noted that, a plurality of methods can realize the function of the second detecting unit 221 and each method may apply a different structure/configuration. For example, the specific structure of the second detecting unit 221 may be referred to the structures shown in FIGS. 5 and 6 and is not repeated herein. It should also be noted that, for illustrative purposes, the first LED lighting device (i.e., functioning as the master light) and the second LED lighting devices (i.e., functioning as the slave lights) may coordinate for operation. Thus, the structure of the second detecting unit 221 may be consistent with the structure of the first detecting unit 121. That is, the method to determine the temporary master light using the second detecting unit 221 may be consistent with the method to determine the temporary master light using the first detecting unit 121. The fourth comparing circuit 222 may be a comparator chip.

In one embodiment, based on the structure shown in FIG. 8, the second detecting unit 221 and the fourth comparing circuit 222 may be integrated into the second processing module in the structure shown in FIG. 9. After the second detecting unit 221 determines the second LED lighting is functioning as the temporary master light, the fourth comparing 222 circuit may obtain the signal strength of the wireless router detected by the second LED lighting device from the second detecting module 21. The fourth comparing circuit 222 may communicate/interact with other LED lighting devices in the wireless network through the third wireless communication module 23 to obtain the signal strengths of the wireless router detected by the other LED lighting devices. Further, the fourth comparing circuit 222 may compare the signal strengths detected by all the LED lighting devices to determine the signal strength detected by the second LED lighting device does not have the maximum value along the signal strengths detected by all the LED lighting devices. The fourth comparing circuit 222 may determine the second LED lighting device to be the temporary master light. The arrangement described above may avoid the simultaneous coordination among a plurality of LED lighting devices in the wireless network to determine the master light. Less resources for processing may be required and processing efficiency can be improved.

Figure 10:
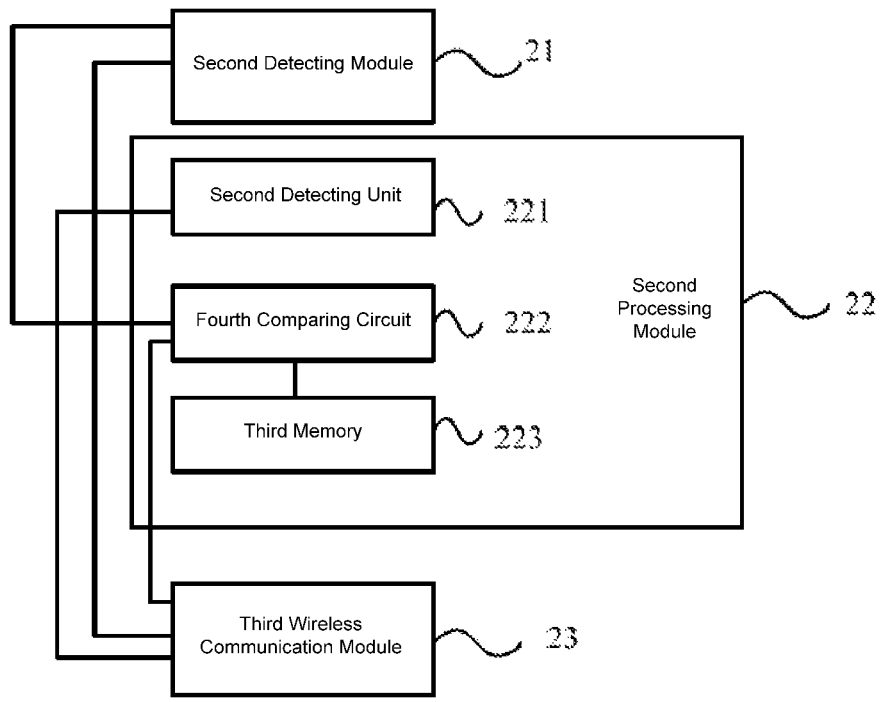
FIG. 10 is a block diagram illustrating another exemplary second LED lighting device consistent with the disclosed embodiments.

FIG. 10 illustrates the structure of another exemplary second LED lighting device provided by the present disclosure. Based on the structure shown in FIG. 9, the second processing module 22 in the second LED lighting device shown in FIG. 10 may further include a third memory 223.

The third memory 223 may be electrically connected to the fourth comparing circuit 222.

The third memory 223 may be used to store the signal strengths of the wireless router detected by all the LED lighting devices obtained by the second LED lighting device when the second LED lighting device, functioning as the temporary master light, is in the process of selecting the master light. Details of the working principles and technical effect of the third memory 223 may be referred to the working principles and technical effects of the first memory 123 illustrated in FIG. 3, and are not repeated herein.

Figure 11:
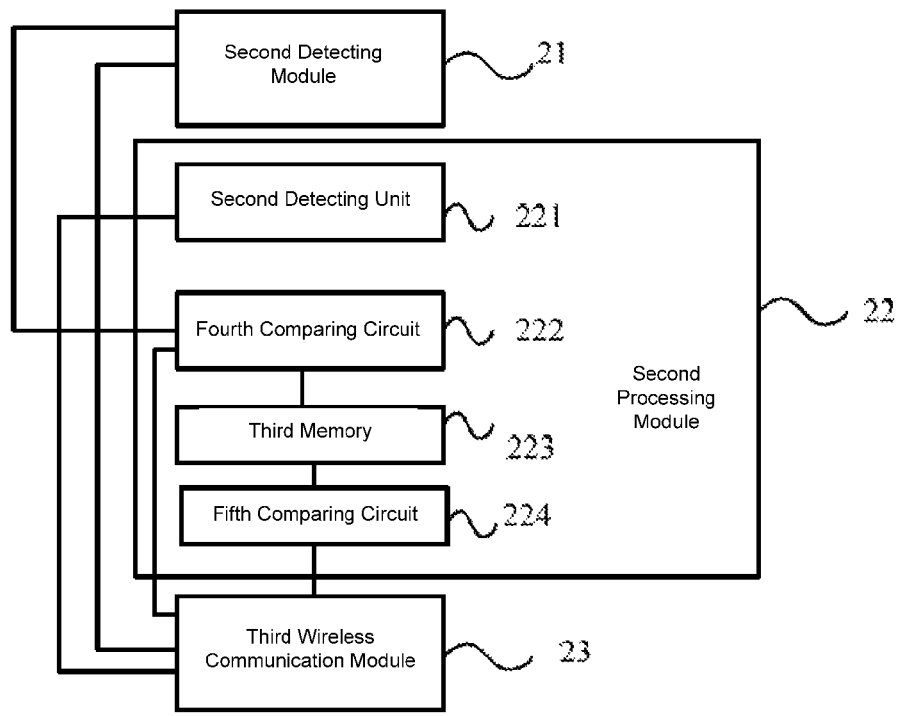
FIG. 11 is a block diagram illustrating another exemplary second LED lighting device consistent with the disclosed embodiments.

FIG. 11 illustrates the structure of another exemplary second LED lighting device provided by the present disclosure. Based on the structure shown in FIG. 10, the second processing module 22 of the second LED lighting device shown in FIG. 11 may further include a fifth comparing circuit 224.

The fifth comparing circuit 224 may be electrically connected to the third wireless communication module 23 and the third memory 223.

The second detecting unit 221 may determine whether the second LED lighting device is functioning as the temporary master light after the third wireless communication module 23 receives a master-light-selecting broadcast message. If the second LED lighting device is not functioning as the temporary master light, the second detecting unit 221 may send a temporary-master-light-obtaining signal to the third wireless communication module 23.

The third wireless communication module 23 may receive the temporary-master-light-obtaining signal and obtain the signal strength of the wireless router detected by the second detecting module 21 based on the temporary-master-light-obtaining signal. When receiving a temporary-master-light-notifying broadcast message (i.e., containing the identification of the temporary master light) sent by another LED lighting device in the wireless network, the third wireless communication module 23 may send the signal strength detected by the second detecting module 21 to the temporary master light based on the identification of the temporary master light. The third wireless communication module 23 may also receive the master-light-notifying broadcast message (i.e., containing the identification of the master light) sent by the temporary master light and send the identification of the master light to the fifth comparing circuit 224.

When the fifth comparing circuit 224 detects the obtained identification of the master light differs from the identification of the second LED lighting device stored in the third memory 223, the fifth comparing circuit 224 may send a master-light-obtaining signal to the third wireless communication module 23.

In one embodiment, after the second detecting unit 221 determines the second LED lighting device is not functioning as the temporary master light, the third wireless communication module 23 may obtain the signal strength of the wireless router detected by the second LED lighting device from the second detecting module 21, and send the obtained signal strength to the temporary master light (i.e., the first LED lighting device or another second LED lighting device). The LED lighting device functioning as the temporary master light (i.e., the first LED lighting device or another second LED lighting device) may compare the signal strengths of the wireless router detected by all the LED lighting devices and determine the signal strength detected by the first LED lighting device has the maximum value. Thus, one of the LED lighting devices in the wireless network functioning as the temporary master light may be used to select the master light. The process described above may avoid simultaneous processing and coordination among a plurality of LED lighting devices for determining the master light. Less resources for process may be required and processing efficiency can be improved.

Figure 12:
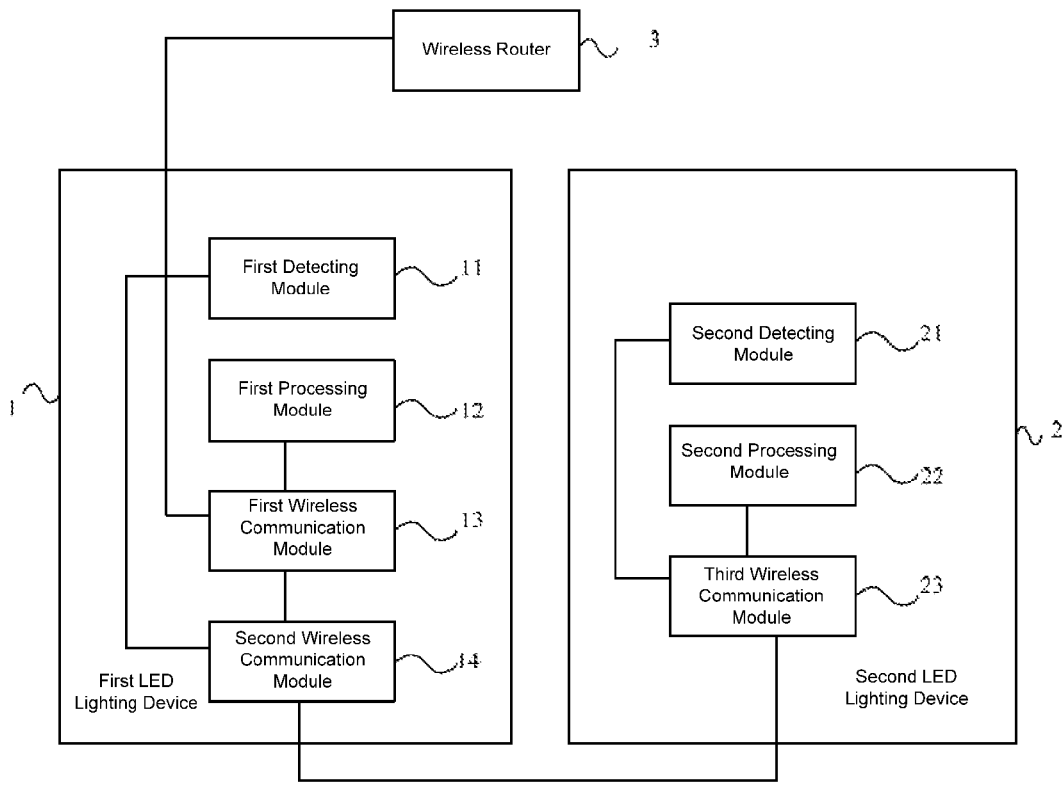
FIG. 12 is a block diagram illustrating an exemplary LED lighting device-based wireless network consistent with the disclosed embodiments.

FIG. 12 illustrates the structure of the LED lighting device-based wireless network provided by the present disclosure. As shown in FIG. 12, the LED lighting device-based wireless network (i.e., the wireless network based on the LED lighting devices) may include a wireless router 3, a first LED lighting device 1 and at least one second LED lighting device 2.

The first LED lighting device 1 may include the first detecting module 11, the first processing module 12, the first wireless communication module 13, and the second wireless communication module 14. The first wireless communication module 13 may enable communication between the first LED lighting device 1 and the wireless router 3. The second wireless communication module 14 may enable communication between the first LED lighting device 1 and the second LED lighting device(s) 2. The second wireless communication module 14 may be electrically connected to the first wireless communication module 13 and the first detecting module 11. The first wireless communication module 13 may be electrically connected to the first processing module 12.

The second LED lighting device 2 may include the second detecting module 21, the second processing module 22, and the third wireless communication module 23. The third wireless communication module 23 may enable the communication between the second LED lighting device 2 and the first LED lighting device 1. The third wireless communication module 23 may be electrically connected to the second detecting module 21 and the second processing module 22.

The first detecting module 11 may receive a detection request sent by the second wireless communication module 14 after the second wireless communication module 14 receives a master-light-selecting broadcast message. The first detecting module 11 may detect the signal strength of the wireless router 3 based on the master-light-selecting broadcast message.

The first processing module 12 may send a start signal to the first wireless communication module 13 if the first processing module 12 detects that the signal strength of the wireless router 3 detected by the first detecting module 11 has the maximum value among the signal strengths detected by all the LED lighting devices in the wireless network.

The first wireless communication module 13 may receive the start signal, and form a connection with the wireless router 3 based on the start signal. The first wireless communication module 13 may also send an LED network-forming request to all the second wireless communication modules 14.

The second wireless communication module 14 may receive the LED network-forming request, and send a master-light-notifying broadcast message containing the identification of the first LED lighting device to all the second LED lighting devices 2 based on the LED network-forming request. The second wireless communication module 14 may form connection with all the second LED lighting devices.

The second detecting module 21 may receive the detection request sent by the third wireless communication module 23 after the third wireless communication module 23 receives a master-light-selecting broadcast message. The second detecting module 21 may detect the signal strength of the wireless router 3 based on the detection request.

The second processing module 22 may send a master-light-obtaining signal to the third wireless communication module 23 if the second processing module 22 detects the signal strength of the wireless router 3 detected by the second detecting module 21 does not have the maximum value among the signal strengths detected by all the LED lighting devices in the wireless network.

The third wireless communication module 23 may receive the master-light-obtaining signal and receive the master-light-notifying broadcast message (i.e., containing the identification of the first LED lighting device) sent by the first LED lighting device 1. The third wireless communication module 23 may form connection with the first LED lighting device 1 based on the identification.

The LED lighting device-based wireless network may include the first LED lighting device shown in FIG. 1 and the second LED lighting device shown in FIG. 8. The working principles and technical effect of the first LED lighting device shown in FIG. 1 and the second LED lighting device shown in FIG. 8 are similar to each other and are not repeated herein.

Further, the first LED lighting device 1 may also have any one of the structures shown in FIGS. 2 to 7, and the second LED lighting device 2 may also have any one of the structures shown in FIGS. 8 to 11. The working principles and technical effect are similar to each other and are not repeated herein.

Figure 13:
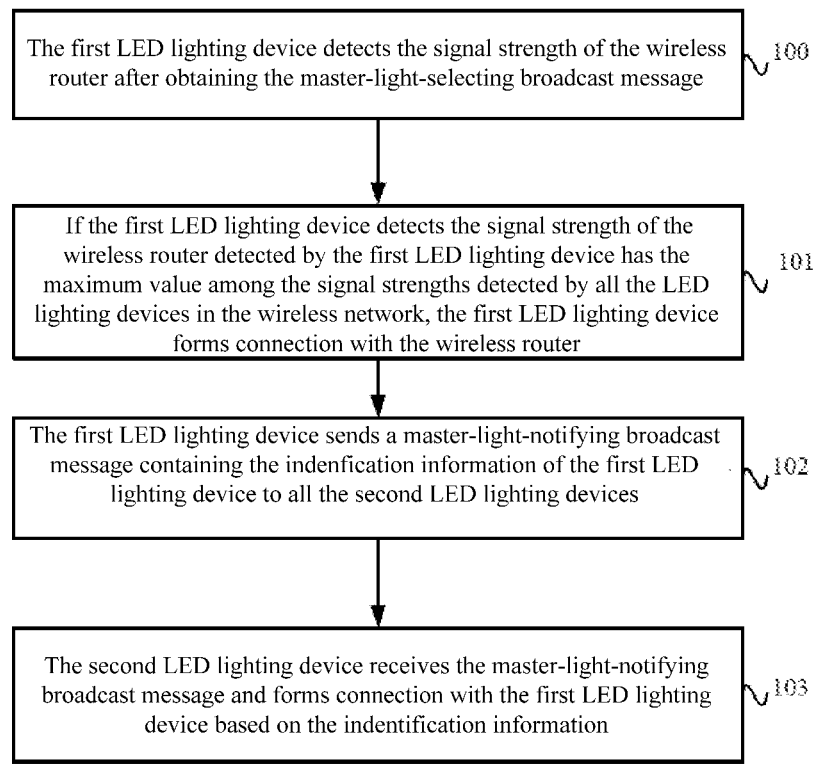
FIG. 13 is a block diagram illustrating an exemplary process of the method for remotely controlling the LED lighting device-based wireless network consistent with the disclosed embodiments.

FIG. 13 illustrates the process of the method for controlling the LED lighting device-based wireless network provided by the present disclosure. As shown in FIG. 13, the method can be applied on the first LED lighting device in the LED lighting device-based wireless network. The wireless network may include the wireless router, the first LED lighting device, and the at least one second LED lighting device. The first LED lighting device may include the first detecting module, the first processing module, the first wireless communication module for communication with the wireless router, and the second wireless communication module for communication with the second LED lighting devices.

The method may include steps 100 to 103.

In step 100, the first LED lighting device may detect the signal strength of the wireless router after receiving the master-light-selecting broadcast message.

In step 101, if the first LED lighting device detects that the signal strength of the wireless router detected by the first LED lighting device has the maximum value among the signal strengths detected by all the LED lighting devices in the wireless network, the first LED lighting device may form a connection with the wireless router.

In step 102, the first LED lighting device may send a master-light-notifying broadcast message containing the identification of the first LED lighting device to all the second LED lighting devices.

In step 103, the second LED lighting device may receive the master-light-notifying broadcast message and form a connection with the first LED lighting device based on the identification contained in the master-light-notifying broadcast message.

For illustrative purposes, the method described above may be used for controlling the first LED lighting device shown in FIG. 1 and the second LED lighting devices shown in FIG. 8. The working principles and technical effect of the first LED lighting device and the second LED lighting device described above may be similar. Details are thus omitted herein.

Further, the method disclosed above can also be used to control the first LED lighting devices shown in FIGS. 2 to 7 and to control the second LED lighting devices shown in FIGS. 9 to 11. Specifically, the step 101 may further include the following steps.

First, when receiving the master-light-selecting broadcast message, the first LED lighting device may determine whether the first LED lighting device is the temporary master light. If the first LED lighting device is the temporary master light, the first LED lighting device may send a temporary-master-lighting-notifying broadcast message to all the second LED lighting devices. The temporary-master-lighting-notifying broadcast message may include the identification of the first LED lighting device.

Further, the first LED lighting device may receive the signal strengths of the wireless router detected by all the second LED lighting devices.

Further, the first LED lighting device may compare the signal strengths detected by all the second LED lighting devices with the signal strength detected by the first LED lighting device. If the first LED lighting device detects the signal strength detected by the first LED lighting device has the maximum value among all the signal strengths, the first LED lighting device may form a connection with the wireless router.

The steps following the step 101 may further include the step described below.

The first LED lighting device may be used to store the signal strengths of the wireless router detected by all the LED lighting devices and obtained by the first LED lighting device when the first LED lighting device is in the process of selecting the master light. The first LED lighting device may use the stored signal strengths of the wireless router to provide the signal strengths for the next selection of the master light.

Further, the step 101 may also include the following steps.

When receiving the master-light-selecting broadcast message, the first LED lighting device may determine whether the first LED lighting device is functioning as the temporary master light. If the first LED lighting device is not functioning as the temporary master light, when the first LED lighting device receives the temporary-master-light-notifying broadcast message (i.e., containing the identification of the second LED lighting device) sent by a second LED lighting device, the first LED lighting device may send the signal strength of the wireless router detected by the first LED lighting device to the second LED lighting device according to the identification of the second LED lighting device.

The first LED lighting device may receive the master-light-notifying broadcast message (i.e., containing the identification of the master light) sent by the second LED lighting device. The first LED lighting device may compare the identification of the master light with the previously-stored identification of the first LED lighting device. If the identification of the master light is the same as the previously-stored identification of the first LED lighting device, the first LED lighting device may form connection with the wireless router.

For illustrative purposes, the method described above may be for controlling of the first LED lighting devices shown in FIGS. 2 to 7 and the second LED lighting devices shown in FIGS. 9 to 11. The working principles and technical effect of any one of the first LED lighting device described above may be similar, and the working principles and technical effect of any one of the second LED lighting device described above may be similar. Details are thus not repeated herein.

It should be noted that, the present disclosure can be realized through software and/or hardware. For example, the devices disclosed may be implemented by using application-specific integrated circuits (ASICs) or other suitable/similar hardware. In certain embodiments, the software programs in the present disclosure may be executed through a central processing unit (CPU) to realize the functions/steps. Similarly, the software programs (including relevant data structure) of the present disclosure can be saved in the readable recording medium of a computer. In addition, certain steps and/functions of the present disclosure can be realized through hardware. For example, a processor can coordinate with certain circuits to realize corresponding functions/steps of the present disclosure.

The embodiments disclosed herein are exemplary only. Other applications, advantages, alternations, modifications, or equivalents to the disclosed embodiments are obvious to those skilled in the art and are intended to be encompassed within the scope of the present disclosure.

REFERENCE SIGN LIST

First detecting module 11
First processing module 12
First wireless communication module 13
Second wireless communication module 14
First detecting unit 121
First comparing circuit 122
First memory 123
Second comparing circuit 124
Flip-flop circuit 1212
Timer 1211
Third comparing circuit 1214
Second memory 1213
Malfunctioning monitoring module 15
Second detecting module 21
Second processing module 22
Third wireless communication module 23
Second detecting unit 221
Fourth comparing circuit 222
Third memory 223
Fifth comparing circuit 224

What is claimed is:

1. A first light-emitting diode (LED) lighting device, comprising an LED lighting source; a first detecting module, a first processing module, a first wireless communication module for communicating with a wireless router in an LED lighting device-based wireless mesh network, and a second wireless communication module for communicating with at least one second lighting device in the LED lighting device-based wireless network, wherein:
   the first wireless communication module is connected to the first processing module;
   the second wireless communication module is connected to both the first wireless communication module and the first detecting module;
   after the second communication module receives a master-light-selecting broadcast message, the first detecting module receives a detection request sent by the second wireless communication module and detects a signal strength of the wireless router based on the detection request;
   when the first processing module determines a signal strength detected by the first detecting module has a maximum value among signal strengths detected by the plurality of LED lighting devices in the LED lighting device-based wireless network, the first wireless communication module forms a connection with the wireless router, and sends an LED network-forming request to the second wireless communication module; and the second wireless communication module sends a master-light-notifying broadcast message to the at least one second LED lighting devices, and forms a connection with the at least one second LED lighting devices, the master-light-notifying broadcast message including an identification of the first LED lighting device.

2. The first LED lighting device according to claim 1, wherein:
the first processing module sends a start signal to the first wireless communication module; and
the first wireless communication module receives the start signal, forms connection with the wireless router based on the start signal, and sends an LED network-forming request to the second wireless communication module.

3. The first LED lighting device according to claim 2, wherein the first processing module comprising a first detecting unit and a first comparing unit, wherein:
the second wireless communication module is connected to the first detecting unit and the first comparing circuit, and the first comparing circuit is connected to the first detecting module and the first wireless communication module;
the first detecting unit determines whether the first LED lighting device is a temporary master light when the second wireless communication module receives a master-light-selecting broadcast message;
if the first LED light is the temporary master light, the first detecting unit sends a temporary-master-light start signal to the second wireless communication module;
the second wireless communication module sends a temporary-master-light broadcast message containing the identification of the first LED lighting device to the at least one second LED lighting devices based on the temporary-master-light start signal, receives signal strengths of the wireless router detected and sent by the at least one second LED lighting devices, and sends the signal strengths of the wireless router detected and sent by the at least one second LED lighting devices to the first comparing circuit;
the first comparing circuit compares the signal strengths sent by the at least one second LED lighting devices with the signal strength detected by the first detecting module; and
if the signal strength detected by the first detecting module has a maximum value among all signal strengths being compared, the first comparing circuit sends the start signal to the first wireless communication module.

4. The first LED lighting device according to claim 3, the first processing module further comprising a first memory connected to the first comparing circuit, wherein:
the first memory is configured to store the signal strengths of the wireless router detected by the plurality of LED lighting devices and obtained by the first LED lighting device during a process of selecting the master light.

5. The first LED lighting device according to claim 4, the first processing module further comprising a second comparing circuit connected to the second wireless communication module, the first wireless communication module, and the first memory, wherein:

the first detecting unit determines whether the first LED lighting device is the temporary master light after the second wireless communication module receives a master-light-selecting broadcast message;
if the first LED lighting device is not the temporary master light, the first detecting unit sends a temporary-master-light-obtaining signal to the second wireless communication module;
the second wireless communication module receives the temporary-master-light-obtaining signal, obtains the signal strength detected by the first detecting module based on the temporary-master-light-obtaining signal;
when the second wireless communication module receives a temporary-master-light-notifying broadcast message containing an identification of a second LED lighting device, the second wireless communication module sends the signal strength detected by the first detecting module to the second LED lighting device based on the identification, receives a master-light-notifying broadcast message containing the identification of the master light sent by the second LED lighting device, and sends the identification of the master light to the second comparing circuit; and
if the second comparing circuit determines the identification of the master light is same as the identification of the first LED lighting device stored in the first memory, the second comparing circuit sends the start signal to the first wireless communication module.

6. The first LED lighting device according to claim 3, the first detecting unit comprising a timer and a flip-flop circuit, wherein:
the timer sets a temporary-master-light operation schedule corresponding to the first LED lighting device such that if an operation time of an LED lighting device starts, the timer sends a triggering signal to the flip-flop circuit; and
the flip-flop circuit receives the triggering signal and indicates whether the first LED lighting device is the temporary master light by controlling flashing of an indicator light or changing color of the indicator light.

7. The first LED lighting device according to claim 3, wherein the first detecting unit comprises a second memory and a third comparing circuit, wherein:
the third comparing circuit is connected to the second memory and the second wireless communication module;
the second memory is configured to store media access control (MAC) addresses of the plurality of LED lighting devices in the LED lighting device-based wireless network; and
the third comparing circuit compares the MAC addresses of the plurality of LED lighting devices to detect whether a MAC address of the first LED lighting device has a maximum value, and the third comparing circuit determines the first LED lighting device to be the temporary master light if the MAC address of the first LED lighting device has the maximum value.

8. The first LED lighting device according to claim 2, wherein the second wireless communication module receives a joining-notifying broadcast message sent by a second LED lighting device joining the LED lighting device-based wireless network such that the second wireless communication module sends a master-light-selecting broadcast message to the at least one second LED lighting device in the LED based wireless network based on the joining-notifying broadcast message.

9. The first LED lighting device according to claim 1, further including a malfunctioning monitoring module connected to the first wireless communication module and the second wireless communication module, wherein:

the first wireless communication module sends a first detection request to the wireless router within a predetermined period after being connected to the wireless router and receives a first feedback signal sent by the wireless router;

the malfunctioning monitoring module monitors whether the first wireless communication module has sent the first detection request within the predetermined period or whether the first wireless communication module has received the first feedback signal sent by the wireless router;

if the malfunctioning monitoring module detects the first wireless communication module has not sent the first detection request within the predetermined period or the first wireless communication module has not received the first feedback signal sent by the wireless router, the malfunctioning monitoring module sends a first master-light-selecting-triggering signal to the second wireless communication module;

the second wireless communication module receives the first master-light-selecting-triggering signal, sends a first master-light-selecting broadcast message to the at least one second LED lighting devices based on the first master-light-selecting-triggering signal; and when the first LED lighting device recovers, the malfunctioning monitoring module detects a recovery and sends recovery information to the second wireless communication module such that the second wireless communication module sends a second master-light-selecting broadcast message to the at least one second LED lighting devices, wherein the first master-light-selecting broadcast message contains malfunctioning information of the first LED lighting device and the second master-light-selecting broadcast message contains the recovery information of the first LED lighting device.

10. The first LED lighting device according to claim 9, wherein:

after connected to the at least one second LED lighting devices, the second wireless communication module sends a second detection request to the at least one second LED lighting devices within a predetermined period and receives second detecting feedback signals sent by the at least one second LED lighting devices;

the malfunctioning monitoring module monitors whether the second wireless communication module has sent the second detection request within the predetermined period or has received the second detecting feedback signals;

if the second wireless communication module has not sent the second detection request within the predetermined period or has not received the second detecting feedback signals, the malfunctioning monitoring module sends a second master-light-selecting triggering signal to the first wireless communication module; and the first wireless communication module receives the second master-light-selecting triggering signal and sends a third master-light-selecting broadcast message to the at least one second LED lighting devices based on the second master-light-selecting triggering signal; and after the first wireless communication module detects a recovery of the first LED lighting device, the first communication module sends a fourth master-light-selecting broadcast message to the at least one second LED lighting devices, the third master-light-selecting broadcast message including malfunctioning information of the first LED lighting device and the fourth master-light-selecting broadcast message including recovery information of the first LED lighting device.

11. A second light-emitting diode (LED) lighting device, comprising: an LED lighting source, a second detecting module, a second processing module, and a third wireless communication module for enabling communication between a first LED lighting device and the second LED lighting device in an LED lighting device-based wireless mesh network, wherein:

the LED lighting device-based wireless mesh network includes a wireless router, the first LED lighting device, and at least one second LED lighting device;

the third wireless communication module is connected to the second detecting module and the second processing module;

the second detecting module receives a detection request sent by the third wireless communication module after the third wireless communication module receives a master-light-selecting broadcast and detects a signal strength of the wireless router based on the detection request;

when the second processing module determines a signal strength of the wireless router detected by the second detecting module does not have a maximum value among signal strengths detected by the plurality of LED lighting devices in the LED lighting device-based wireless mesh network, the second processing module sends a master-light-obtaining signal to the third wireless communication module; and the third wireless communication module receives the master-light-obtaining signal, receives a master-light-notifying broadcast message containing identification of the first LED lighting device sent by the first LED lighting device, and forms a connection with the first LED lighting device based on the identification of the first LED lighting device.

12. The second LED lighting device according to claim 11, wherein the second processing module comprises a second detecting unit and a fourth comparing circuit, wherein:

the third wireless communication module is connected to the second detecting unit and the fourth comparing circuit, and the fourth comparing circuit is connected to the second detecting module;

the second detecting unit determines whether the second LED lighting device is a temporary master light after the third wireless communication module obtains a master-light-selecting broadcast message such that if the second LED lighting device is the temporary master light, the second detecting unit sends a temporary-master-light start signal to the third wireless communication module;

the third wireless communication module sends a temporary-master-light-notifying broadcast message containing identification of the second LED lighting device to other LED lighting devices in the LED lighting device-based wireless mesh network based on the temporary-master-light start signal, receives signal strengths of the wireless router detected by the other LED lighting devices, and sends the signal strengths to the fourth comparing circuit; and the fourth comparing circuit compares the signal strengths detected by the other LED lighting devices with a signal strength detected by the second detecting module such that if the fourth comparing circuit determines that the signal strength detected by the second detecting module does not have a maximum value among signal strengths detected by the plurality of LED lighting devices, the fourth comparing circuit sends a master-light-obtaining signal to the third wireless communication module.

13. The second LED lighting device according to claim 12, wherein the second processing module further comprises a third memory connected to the fourth comparing circuit, wherein:
the third memory is configured to store the signal strengths detected by the plurality of LED lighting devices and obtained by the second LED lighting device when the second LED lighting device is in a process of selecting the master light.

14. The second LED lighting device according to claim 13, wherein the second processing module further comprises a fifth comparing circuit connected to the third wireless communication module and the third memory, wherein:
the second detecting unit determines whether the second LED lighting device is the temporary master light after the third wireless communication module receives a master-light-selecting broadcast message such that if the second LED lighting device is not the temporary master light, the second detecting unit sends a temporary-master-light-obtaining signal to the third wireless communication module;
the third wireless communication module receives the temporary-master-light-obtaining signal, obtains the signal strength of the wireless router detected by the second detecting module based on the temporary-master-light-obtaining signal, sends the signal strength detected by the second detecting module to the temporary master light based on the identification of the temporary master light when receiving a temporary-master-light-notifying broadcast message containing identification of the temporary master light sent by another LED lighting device in the wireless mesh network, receives the master-light-notifying broadcast message containing the identification of the master light sent by the temporary master light, and sends the identification of the master light to the fifth comparing circuit; and
when the fifth comparing circuit determines the obtained identification of the master light differs from the identification of the second LED lighting device stored in the third memory, the fifth comparing circuit sends a master-light-obtaining signal to the third wireless communication module.

15. An LED lighting device-based wireless mesh network, comprising a wireless router, a first LED lighting device according to any one of claim 1, and at least one second LED lighting device according to any one of claim 11.

16. A method for remotely controlling the LED lighting device-based wireless mesh network according to claim 15, comprising:
the first LED lighting device detecting the signal strength of the wireless router after obtaining a master-light-selecting broadcast message;
if the first LED lighting device determines the signal strength of the wireless router detected by the first LED lighting device has a maximum value among the signal strengths detected by the plurality of LED lighting devices in the LED lighting device-based wireless mesh network, the first LED lighting device forming connection with the wireless router;
the first LED lighting device sending the master-light-notifying broadcast message containing the identification of the first LED lighting device to the at least one second LED lighting devices; and
the second LED lighting device receiving the master-light-notifying broadcast message and forming the connection with the first LED lighting device based on the identification.

17. The method according to claim 16, wherein the first LED lighting device forming connection with the wireless router comprises:
when receiving a master-light-selecting broadcast message, the first LED lighting device determining whether the first LED lighting device is the temporary master light;
if the first LED lighting device is the temporary master light, the first LED lighting device sending a temporary-master-lighting-notifying broadcast message containing the identification of the first LED lighting device to the at least one second LED lighting devices;
the first LED lighting device receiving the signal strengths of the wireless router detected by the at least one second LED lighting devices;
the first LED lighting device comparing the signal strengths detected by the at least one second LED lighting devices with the signal strength detected by the first LED lighting device; and
if the first LED lighting device determines the signal strength detected by the first LED lighting device has a maximum value among signal strengths being compared, the first LED lighting device forms the connection with the wireless router.

18. The method according to claim 17, further comprising:
the first LED lighting device storing the signal strengths of the wireless router detected by the plurality of LED lighting devices and obtained by the first LED lighting device in the process of selecting the master light and uses stored signal strengths to provide signal strengths for another process of selecting of the master light.

19. The method according to claim 16, wherein the first LED lighting device forming connection with the wireless router comprises:
when receiving the master-light-selecting broadcast message, the first LED lighting device determining whether the first LED lighting device is the temporary master light;
if the first LED lighting device is not the temporary master light, when the first LED lighting device receives a temporary-master-light-notifying broadcast message containing the identification of a second LED lighting device sent by the second LED lighting device, the first LED lighting device sending the signal strength of the wireless router detected by the first LED lighting device to the second LED lighting device according to the identification of the second LED lighting device;
the first LED lighting device receiving a master-light-notifying broadcast message containing identification of the master light sent by a second LED lighting device and the first LED lighting device comparing the identification of the master light with previously-stored identification of the first LED lighting device; and
if the identification of the master light is the same as the previously-stored identification of the first LED lighting device, the first LED lighting device forming the connection with the wireless router.

\* \* \* \* \*